US009432601B2

(12) United States Patent
Sei

(10) Patent No.: US 9,432,601 B2
(45) Date of Patent: Aug. 30, 2016

(54) DEFECTIVE PIXEL CORRECTING APPARATUS, IMAGING APPARATUS, AND METHOD OF CORRECTING DEFECTIVE PIXEL

(71) Applicant: SOCIONEXT INC., Yokohama-shi, Kanagawa (JP)

(72) Inventor: Masafumi Sei, Sagamihara (JP)

(73) Assignee: SOCIONEXT INC., Yokohama (JP)

( * ) Notice: Subject to any disclaimer, the term of this patent is extended or adjusted under 35 U.S.C. 154(b) by 0 days.

(21) Appl. No.: 14/625,492

(22) Filed: Feb. 18, 2015

(65) Prior Publication Data

US 2015/0271422 A1 Sep. 24, 2015

(30) Foreign Application Priority Data

Mar. 20, 2014 (JP) ................................ 2014-058105

(51) Int. Cl.

| | |
|---|---|
| ***G06K 9/38*** | (2006.01) |
| ***G06K 9/40*** | (2006.01) |
| ***H04N 5/367*** | (2011.01) |
| ***H04N 5/232*** | (2006.01) |
| ***G06T 5/00*** | (2006.01) |
| *H04N 19/117* | (2014.01) |
| *H04N 9/04* | (2006.01) |

(52) U.S. Cl.

CPC ............... *H04N 5/367* (2013.01); *G06T 5/002* (2013.01); *G06T 5/003* (2013.01); *H04N 5/23293* (2013.01); *H04N 9/045* (2013.01); *H04N 19/117* (2014.11)

(58) Field of Classification Search

CPC ............. H04N 5/23293; H04N 5/367; H04N 19/117; H04N 9/045; G06T 5/002; G06T 5/003

USPC .......................................... 382/270, 274–275

See application file for complete search history.

(56) References Cited

U.S. PATENT DOCUMENTS

| | | | | |
|---|---|---|---|---|
| 7,800,661 B2 * | 9/2010 | Forutanpour .......... | H04N 5/217 348/241 |
| 7,884,864 B2 * | 2/2011 | Hamamoto ............ | H04N 9/045 348/241 |

(Continued)

FOREIGN PATENT DOCUMENTS

| | | |
|---|---|---|
| JP | 2003-111088 A | 4/2003 |
| JP | 2005-142997 A | 6/2005 |
| JP | 2006-148230 A | 6/2006 |

*Primary Examiner* — Kanjibhai Patel
(74) *Attorney, Agent, or Firm* — Arent Fox LLP

(57) ABSTRACT

An apparatus for correcting a defective pixel includes a unit configured to obtain a first corrected value based on a maximum value or minimum value of values of surrounding pixels around a defective pixel, a unit configured to identify a direction in which a change in pixel values is the smallest based on the values of the surrounding pixels, and configured to obtain a second corrected value responsive to values of pixels situated in the identified direction among the surrounding pixels, and a selection unit configured to select the first corrected value when a difference between a value of the defective pixel and a representative value of the surrounding pixels is smaller than a first threshold value, configured to select the second corrected value when the difference is larger than or equal to a second threshold value that is larger than or equal to the first threshold value.

9 Claims, 6 Drawing Sheets

(56) References Cited

U.S. PATENT DOCUMENTS 7,983,508 B2 * 7/2011 Guan .................... H04N 5/217 382/254
8,208,046 B2 * 6/2012 Ogino .................... H04N 5/365 348/246
8,212,899 B2 * 7/2012 Egawa .................... H04N 5/367 348/241
8,576,309 B2 * 11/2013 Hashizume .......... H04N 5/3675 348/222.1
2003/0063202 A1 4/2003 Toyoda et al.
2006/0044425 A1 * 3/2006 Yeung .................... H04N 5/367 348/246
2008/0143856 A1 * 6/2008 Pinto ...................... H04N 9/045 348/246
2009/0310849 A1 * 12/2009 Katou .................. H04N 5/3675 382/149

* cited by examiner

FIG.2
| mm | om | pm |
|---|---|---|
| mo | oo | po |
| mp | op | pp |
FIG.3
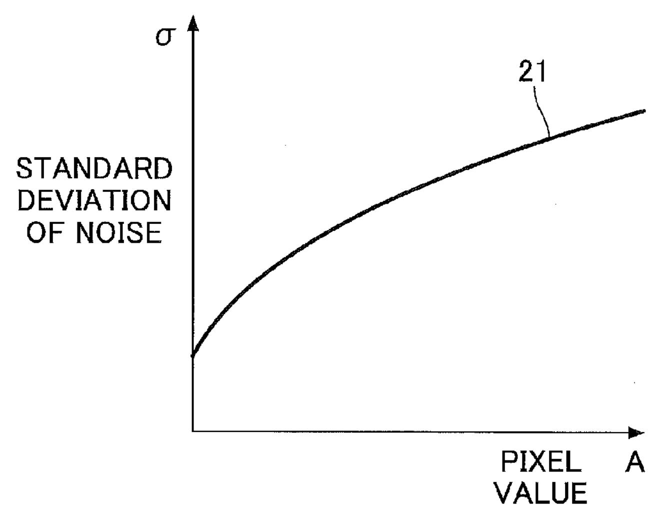
FIG.4
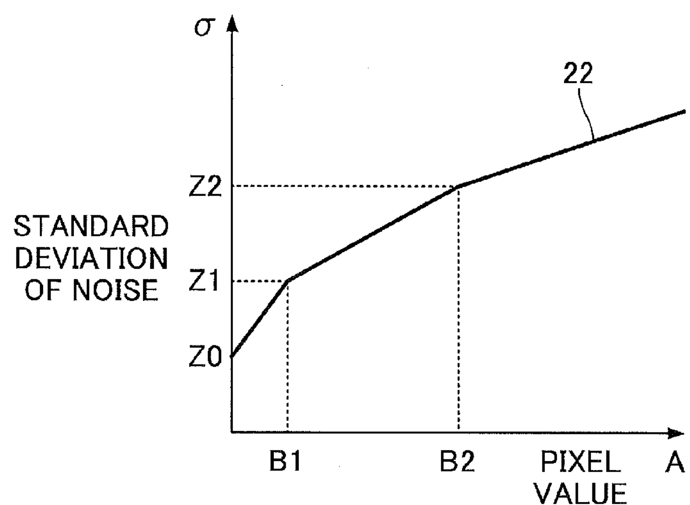

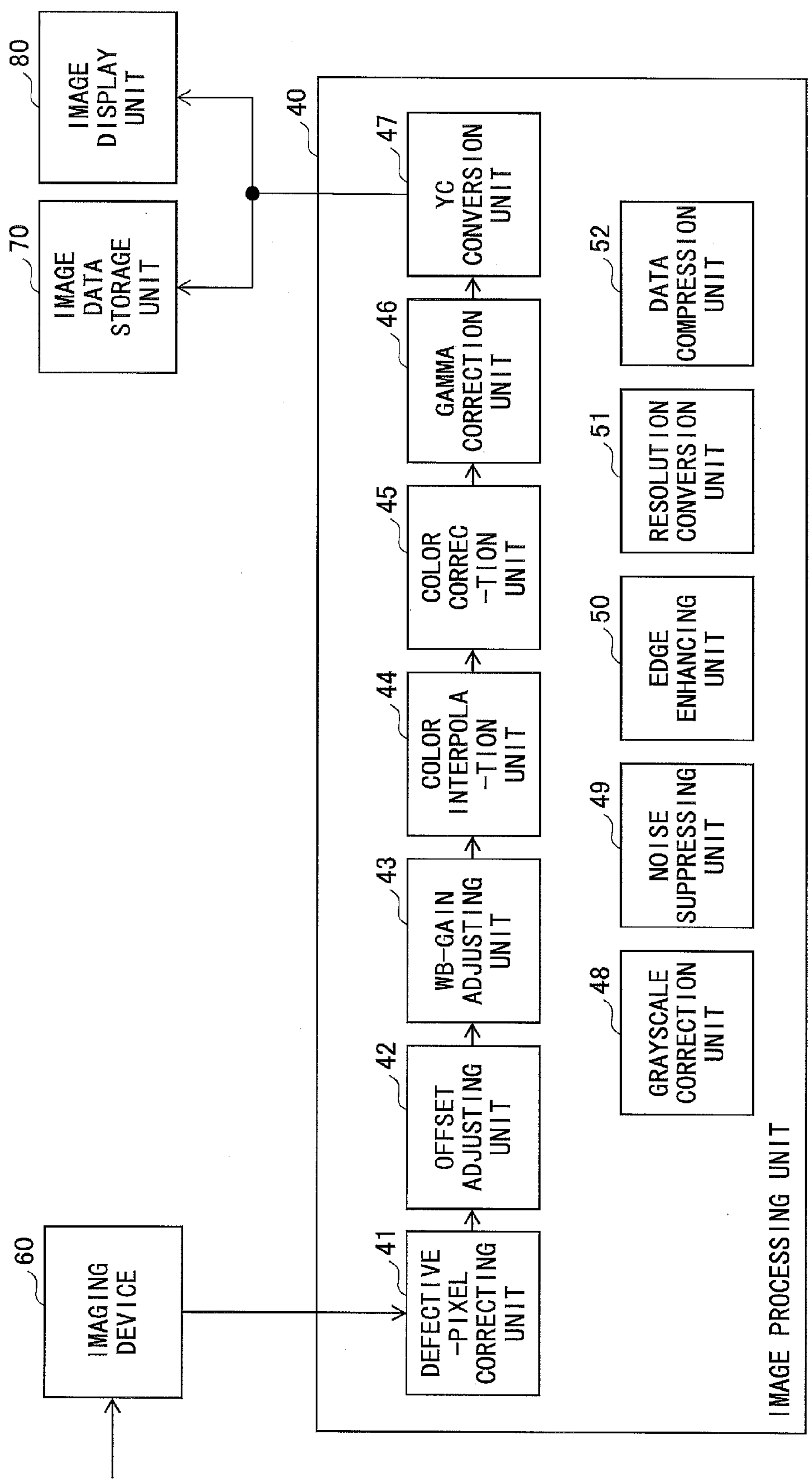
FIG.13
80
IMAGE DISPLAY UNIT
70
IMAGE DATA STORAGE UNIT
40
47
YC CONVERSION UNIT
46
GAMMA CORRECTION UNIT
45
COLOR CORREC -TION UNIT
44
COLOR INTERPOLA -TION UNIT
43
WB-GAIN ADJUSTING UNIT
42
OFFSET ADJUSTING UNIT
41
DEFECTIVE -PIXEL CORRECTING UNIT
60
IMAGING DEVICE
52
DATA COMPRESSION UNIT
51
RESOLUTION CONVERSION UNIT
50
EDGE ENHANCING UNIT
49
NOISE SUPPRESSING UNIT
48
GRAYSCALE CORRECTION UNIT
IMAGE PROCESSING UNIT

DEFECTIVE PIXEL CORRECTING APPARATUS, IMAGING APPARATUS, AND METHOD OF CORRECTING DEFECTIVE PIXEL

CROSS-REFERENCE TO RELATED APPLICATIONS

The present application is based upon and claims the benefit of priority from the prior Japanese Patent Application No. 2014-058105 filed on Mar. 20, 2014, with the Japanese Patent Office, the entire contents of which are incorporated herein by reference.

FIELD

The disclosures herein relate to a defective pixel correcting apparatus, an imaging apparatus, and a method of correcting a defective pixel.

BACKGROUND

An imaging device employed in an imaging apparatus such as a digital camera has a light receiving section having a plurality of photo diodes arranged in a matrix. These photo diodes serve as individual pixels for imaging purposes. Incident light is subjected to photoelectrical conversion on a pixel-by-pixel basis to generate electric charge, which is output from the imaging device. The pixels formed in the light receiving section may include those which are defective and thus fail to properly operate. Such pixels include black defect pixels that always appear as a dark point (i.e., black point) and white defect pixels that always appear as a bright point (i.e., white point).

Technology for correcting defective pixels include replacing the value of a pixel of interest with the value of a pixel adjacent to the pixel of interest. In this method, the pixel of interest is ascertained to be a white defect when the value of the pixel of interest is larger than a value obtained by adding a predetermined threshold to the maximum value of surrounding pixels. In such a case, the value of the pixel of interest is replaced with the maximum value of the surrounding pixels. Further, the pixel of interest is ascertained to be a black defect when the value of the pixel of interest is smaller than a value obtained by subtracting a predetermined threshold from the minimum value of surrounding pixels. In such a case, the value of the pixel of interest is replaced with the minimum value of the surrounding pixels. In other cases, the pixel of interest is ascertained to be non-defective, and the value of the pixel of interest is kept as it is.

The above-noted technology for correcting defective pixels successfully avoids the situation in which excessive correction ends up worsening an image. However, insufficient correction may create a case in which a corrected pixel is conspicuous in the resultant image. For example, there may be a straight-line boundary between a black area and a white area, and a white defect pixel may be present in the black area at a point abutting the border. In this case, the value of this defective pixel present in the black area is replaced with a white value since the maximum value of the surrounding pixels around this defective pixel is white, resulting in the corrected pixel being conspicuous.

In consideration of these, it is ideally preferable to detect the directivity of an image such as an edge direction and to use an appropriate corrective pixel value responsive to the detected directivity.

For example, a certain technology for correcting defective pixels based on image directivity (e.g., Patent Document 1) ascertains whether a pixel of interest is a defective pixel by use of an ascertaining method similar to the one used in the above-noted related art, and maintains the value of the pixel of interest without any change in the case in which the pixel of interest is not a defective pixel.

In the case in which the pixel of interest is a defective pixel, the direction in which changes in pixel values are relatively small is identified based on the values of surrounding pixels around the pixel of interest, followed by correcting the value of the pixel of interest based on the values of the surrounding pixels situated in the identified direction. Such a correction method may, for example, replace the value of a pixel of interest with an average of the value of a pixel immediately above the pixel of interest and the value of a pixel immediately below the pixel of interest in the case of a vertical direction being selected. Further, in the case of a horizontal direction being selected, the value of a pixel of interest may be replaced with an average of the value of a pixel on the immediate left of the pixel of interest and the value of a pixel on the immediate right of the pixel of interest. In the case of a direction sloping upward to the right being selected, the value of a pixel of interest may be replaced with an average of the value of a pixel on the immediate upper right of the pixel of interest and the value of a pixel on the immediate lower left of the pixel of interest. Moreover, in the case of a direction sloping upward to the left being selected, the value of a pixel of interest may be replaced with an average of the value of a pixel on the immediate upper left of the pixel of interest and the value of a pixel on the immediate lower right of the pixel of interest. When no direction is identified, the value of the pixel of interest may be replaced with an average of all the surrounding pixels.

The technology for correcting defective pixels described above attends to correction by taking into account the direction of an edge in an image, so that the correction is rarely insufficient, resulting in the corrected pixel value being likely to fit in the image. A failure to make a proper determination of the direction, however, may end up making the image worse than the original image. For example, an image may have a thin black line having a width of one pixel and extending in a horizontal direction against the white background. A pixel of interest may be situated on the black line. The values of pixels of the black line may have slight variation from pixel to pixel whereas the pixels in the white background may have approximately the same constant value. In this case, an attempt to identify the direction in which changes in pixel values are relatively small based on the values of surrounding pixels around the pixel of interest may ends up selecting the vertical direction as the direction of relatively small changes in pixel values. This is because the value of a pixel immediately above the pixel of interest and the value of a pixel immediately below the pixel of interest are approximately the same. As a result, the value of the pixel of interest situated on the black line is replaced with an average of the value of a pixel (i.e., white pixel) immediately above the pixel of interest and the value of a pixel (i.e., white pixel) immediately below the pixel of interest. The black line is thus disconnected halfway through.

[Patent Document 1] Japanese Laid-open Patent Publication No. 2005142997

[Patent Document 2] Japanese Laid-open Patent Publication No. 2003111088

[Patent Document 3] Japanese Laid-open Patent Publication No. 2006148230

SUMMARY

According to an aspect of the embodiment, an apparatus for correcting a defective pixel includes a first correction unit configured to obtain a first corrected value based on a maximum value or minimum value of values of surrounding pixels around a defective pixel, a second correction unit configured to identify a direction in which a change in pixel values is the smallest based on the values of the surrounding pixels, and configured to obtain a second corrected value responsive to values of pixels situated in the identified direction among the surrounding pixels, and a selection unit configured to select the first corrected value when a difference between a value of the defective pixel and a representative value of the surrounding pixels is smaller than a first threshold value, configured to select the second corrected value when the difference is larger than or equal to a second threshold value that is larger than or equal to the first threshold value, and configured to output the selected corrected value.

The object and advantages of the embodiment will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 2 is a drawing illustrating a pixel of interest and the 8 neighbor pixels thereof;

FIG. 3 is a drawing illustrating an example of a standard deviation calculated by a standard-deviation calculating unit;

FIG. 4 is a drawing illustrating another example of the standard deviation calculated by the standard-deviation calculating unit;

FIG. 13 is a drawing illustrating an example of the configuration of an imaging apparatus.

DESCRIPTION OF EMBODIMENTS

In the following, embodiments of the invention will be described with reference to the accompanying drawings. In these drawings, the same or corresponding elements are referred to by the same or corresponding numerals, and a description thereof will be omitted as appropriate.

Figure 1:
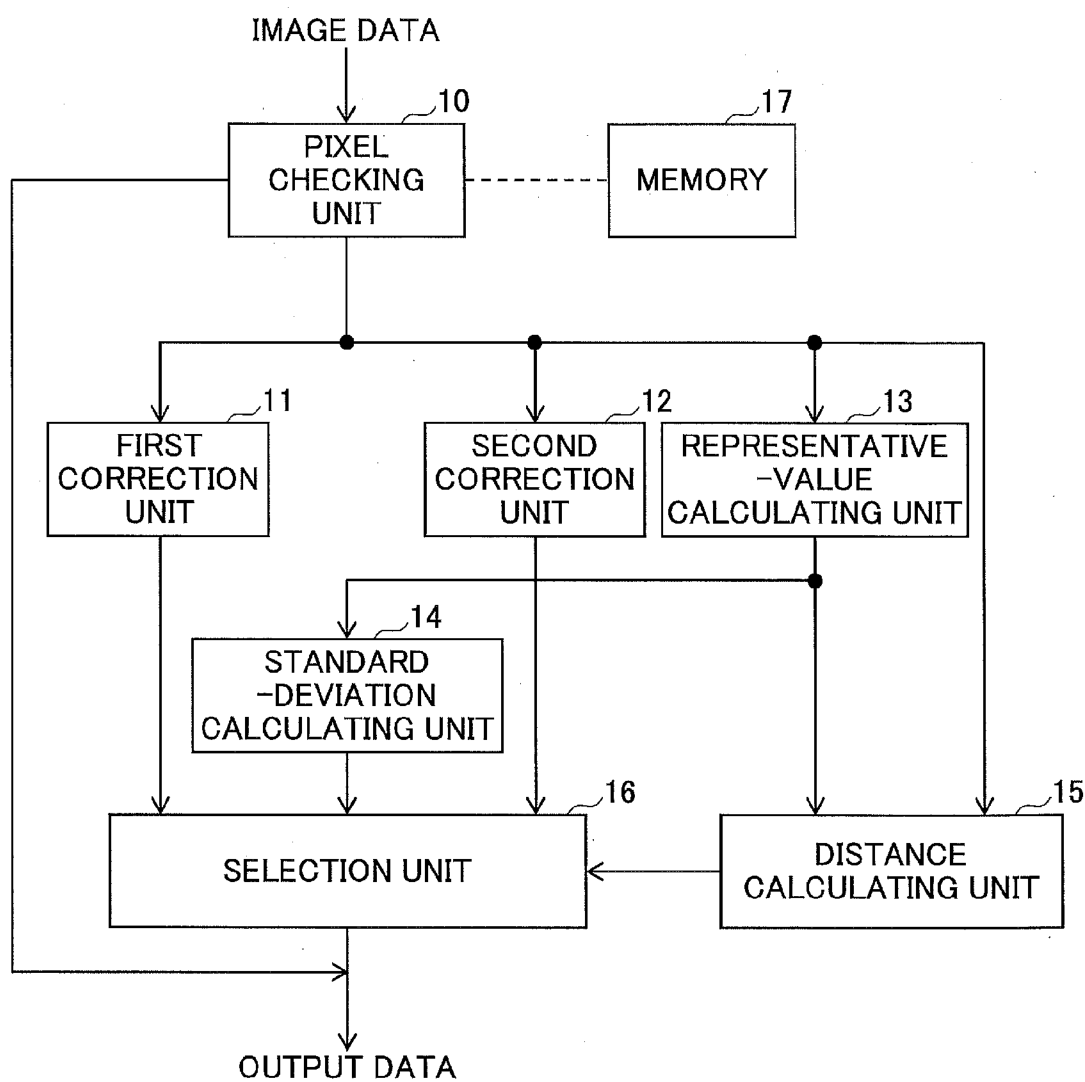
FIG. 1 is a drawing illustrating an example of the configuration of an apparatus for correcting a defective pixel according to an embodiment.

FIG. 1 is a drawing illustrating an example of the configuration of an apparatus for correcting a defective pixel according to an embodiment. The defective pixel correcting apparatus illustrated in FIG. 1 includes a pixel checking unit 10, a first correction unit 11, a second correction unit 12, a representative-value calculating unit 13, a standard-deviation calculating unit 14, a distance calculating unit 15, and a selection unit 16. The defective pixel correcting apparatus illustrated in FIG. 1 may be a semiconductor integrated circuit, and is embedded in an imaging apparatus such as a digital camera as part of an image processing unit that performs image processing on image data (i.e., image signal) supplied from an imaging device.

In FIG. 1, boundaries between functional or circuit blocks illustrated as boxes basically indicate functional boundaries, and may not correspond to separation in terms of physical positions, separation in terms of electrical signals, separation in terms of control logic, etc. Each functional or circuit block may be a hardware module that is physically separated from other blocks to some extent, or may indicate a function in a hardware module in which this and other blocks are physically combined together.

The pixel checking unit 10 checks whether a pixel of interest in the supplied image data is a defective pixel. In so doing, the pixel checking unit 10 may perform the defective-pixel check based on a maximum value or a minimum value among the values of surrounding pixels (e.g., 8 neighbor pixels) around the pixel of interest. For example, the pixel of interest may be ascertained to be a defective pixel in the case in which the value of the pixel of interest is larger than a value obtained by adding a predetermined threshold value to the maximum value of the surrounding pixels (i.e., in the case of a white defect), or in the case in which the value of the pixel of interest is smaller than a value obtained by subtracting a predetermined threshold value from the minimum value of the surrounding pixels (i.e., in the case of a black defect). Otherwise, the pixel of interest may be ascertained to be non-defective.

FIG. 2 is a drawing illustrating a pixel of interest and the 8 neighbor pixels thereof. With a pixel position oo being the position of the pixel of interest, the 8 neighbor pixels include pixels at pixel positions mm, om, pm, mo, po, mp, op, and pp, which are all adjacent to the pixel position oo. In the following, the values of these surrounding pixels are denoted as Amm, Aom, Apm, Amo, Apo, Amp, Aop, and App, and the value of the pixel of interest is denoted as Aoo. Further, the maximum value of the pixel values of the surrounding pixels is denoted as Amax, and the minimum value is denoted as Amin. Moreover, the threshold value employed in the defective-pixel check is denoted as TH. The pixel checking unit 10 determines that the pixel of interest is a white defect in the case of $Amax+TH<Aoo$, and determines that the pixel of interest is a black defect in the case of $Amin-TH>Aoo$. In the present embodiment, the surrounding pixels do not have to be the 8 neighbor pixels, and may instead be the 4 neighbor pixels or the 24 neighbor pixels, for example.

The threshold TH for the defective-pixel check may be a constant value. Alternatively, the threshold TH may vary depending on the representative value (e.g., average value) of the values of surrounding pixels. In general, a defective pixel tends to be inconspicuous in a bright area even when the value of the defective pixel differs by a large amount from the true value of this pixel, and tends to be conspicuous in a dark area even when the value of the defective pixel differs by only a small amount from the true value of this pixel. In consideration of this, the threshold value may be set to a relatively large value in a bright area (i.e., in the case of the above-noted representative value being large), and may be set to a relatively small value in a dark area (i.e., in the case of the above-noted representative value being small).

Referring to FIG. 1 again, as an alternative to the previously-noted check method, the pixel checking unit 10 may check whether the pixel of interest is a defective pixel based on the information indicative of the position of a defective pixel that is stored in a memory 17 in advance. In this arrangement, the position of each defective pixel detected in advance is stored in advance in the memory 17. The pixel checking unit 10 compares the positon of the pixel of interest with each of the positions registered in the memory 17, and determines that the pixel of interest is a defective pixel in response to finding a match.

Image data of the pixel of interest ascertained to be a defective pixel by the pixel checking unit 10 and the surrounding pixels thereof are sent from the pixel checking unit 10 to the first correction unit 11, the second correction unit 12, the representative-value calculating unit 13, and the distance calculating unit 15. Image data of the pixel of interest ascertained to be a non-defective pixel by the pixel checking unit 10 are output without any change as the output of the defective-pixel correcting apparatus.

The first correction unit 11 obtains a first corrected value based on the maximum value or minimum value of the values of the surrounding pixels around the pixel of interest. The first correction unit 11 may output, as a corrected value to replace the value of the pixel of interest, a value responsive to the maximum value of the surrounding pixels (the output value may be the maximum value itself) in the case of the value of the pixel of interest being larger than a value obtained by adding a predetermined threshold value to the maximum value of the surrounding pixels. The first correction unit 11 may output, as a corrected value to replace the value of the pixel of interest, a value responsive to the minimum value of the surrounding pixels (the output value may be the minimum value itself) in the case of the value of the pixel of interest being smaller than a value obtained by subtracting a predetermined threshold value from the minimum value of the surrounding pixels. Namely, the first correction unit 11 replaces the value Aoo of the pixel of interest with Amax in the case of the pixel of interest being a white defect, and replaces the value Aoo of the pixel of interest with Amin in the case of the pixel of interest being a black defect. In other cases, the first correction unit 11 may output the value of the pixel of interest as it is as a corrected value. The event in which the value of the pixel of interest is output as a corrected value without any change occurs when the threshold value employed in the defective-pixel check by the pixel checking unit 10 differs from the threshold value employed by the first correction unit 11 or when the defective-pixel check is performed based on the information stored in the defective-pixel memory 17.

The second correction unit 12 identifies the direction in which a change in pixel values is the smallest based on the values of the surrounding pixels, and obtains a second corrected value responsive to the values of pixels situated in the identified direction among the surrounding pixels. The 8 neighbor pixels illustrated in FIG. 2 may be employed to identify the direction in which a change in pixel values is the smallest. In such a case, the absolute value of a difference between the values of two pixels immediately adjacent to the pixel of interest is obtained with respect to the two pixels situated in a direction of interest, which is one of the vertical direction, the horizontal direction, the diagonal direction sloping upward to the left, and the diagonal direction sloping upward to the right as follows.

$$\mathrm{abs}V=\mathrm{abs}(Aom-Aop)$$

$$\mathrm{abs}H=\mathrm{abs}(Amo-Apo)$$

$$\mathrm{abs}N=\mathrm{abs}(Amm-App)$$

$$\mathrm{abs}Z=\mathrm{abs}(Amp-Apm)$$

Here, abs(x) is the function that obtains the absolute value of value x. Based on the values as obtained above, a determination is made that the direction in which a change in pixel values is the smallest is the vertical direction in the case of absV alone is the smallest. In the case of absH alone being the smallest, a determination is made that the direction in which a change in pixel values is the smallest is the horizontal direction. In the case of absN alone being the smallest, a determination is made that the direction in which a change in pixel values is the smallest is the diagonal direction sloping upward to the left. In the case of absZ alone being the smallest, a determination is made that the direction in which a change in pixel values is the smallest is the diagonal direction sloping upward to the right. In other cases, the direction in which a change in pixel values is the smallest is not identifiable.

Upon detecting the direction in which a change in pixel values is the smallest as described above, the second correction unit 12 obtains an average of the values of the two pixels adjacent to the pixel of interest in the detected direction, followed by outputting the obtained average as the second corrected value. When the vertical direction is the direction in which a change in pixel values is the smallest, the second correction unit 12 may output an average of the value of a pixel immediately above the pixel of interest and the value of a pixel immediately below the pixel of interest, i.e., (Aom+Aop)/2. When the horizontal direction is the direction in which a change in pixel values is the smallest, the second correction unit 12 may output an average of the value of a pixel on the immediate left of the pixel of interest and the value of a pixel on the immediate right of the pixel of interest, i.e., (Amo+Apo)/2. When the diagonal direction sloping upward to the right is the direction in which a change in pixel values is the smallest, the second correction unit 12 may output an average of the value of a pixel on the immediate upper right of the pixel of interest and the value of a pixel on the immediate lower left of the pixel of interest, i.e., (Apm+Amp)/2. When the diagonal direction sloping upward to the left is the direction in which a change in pixel values is the smallest, the second correction unit 12 may output an average of the value of a pixel on the immediate upper left of the pixel of interest and the value of a pixel on the immediate lower right of the pixel of interest, i.e., (Amm+App)/2. When the direction in which a change in pixel values is the smallest is not identifiable, the second correction unit 12 may output an average of the values of all the surrounding pixels.

The representative-value calculating unit 13 obtains a representative value of the values of the surrounding pixels. The representative value may be an average of the values of the surrounding pixels. Alternatively, the representative value may be a weighted average of the values of the surrounding pixels. Alternatively, the representative value may be a median value of the values of the surrounding pixels.

The standard-deviation calculating unit 14 outputs a reference value responsive to the representative value of the surrounding pixels. This reference value may be the standard deviation of noise in pixel values. The reference value may increase as the representative value increases, as will be described later.

FIG. 3 is a drawing illustrating an example of the standard deviation calculated by the standard-deviation calculating unit 14. In FIG. 3, the horizontal axis represents pixel value A, and the vertical axis represents the value of the standard deviation of noise that is superimposed on an image. In general, the magnitude of noise superimposed on a pixel value depends on the magnitude of the pixel value. There is a tendency that the larger the pixel value is, the larger the amplitude of noise is. Namely, the standard deviation of noise superimposed on a pixel value increases as the pixel value increases. FIG. 3 illustrates an example of the standard deviation of noise as a characteristic curve 21. The characteristic curve 21 may be obtained by capturing various images by use of an imaging apparatus equipped with the defective-pixel correcting apparatus illustrated in FIG. 1 and by measuring the actual amount of noise superimposed on the captured image data, for example.

The standard-deviation calculating unit 14 may have a lookup table in which pixel values are associated with standard deviations in such a manner as to represent the characteristic curve 21. The standard-deviation calculating unit 14 may extract the standard deviation corresponding to the representative value (i.e., pixel value) supplied from the representative-value calculating unit 13 to output the extracted value. Alternatively, the standard-deviation calculating unit 14 may have a calculation formula corresponding to the characteristic curve 21. The standard-deviation calculating unit 14 may use the calculating formula to calculate the standard deviation corresponding to the representative value (i.e., pixel value) supplied from the representative-value calculating unit 13 to output the calculated value.

FIG. 4 is a drawing illustrating another example of the standard deviation calculated by the standard-deviation calculating unit 14. In FIG. 4, the horizontal axis represents pixel value A, and the vertical axis represents the value of the standard deviation of noise that is superimposed on an image. A characteristic broken line 22 illustrated in FIG. 4 corresponds to a polygonal line function that approximates the characteristic curve illustrated in FIG. 3. The standard-deviation calculating unit 14 may have a calculation formula corresponding to the characteristic broken line 22. The standard-deviation calculating unit 14 may use the calculating formula to calculate the standard deviation corresponding to the representative value (i.e., pixel value) supplied from the representative-value calculating unit 13 to output the calculated value. Further simplification may be made to use a straight line to approximate the characteristic curve 21.

Referring to FIG. 1 again, the distance calculating unit 15 obtains a difference G between the value Aoo of the defective pixel and the representative value of the surrounding pixels. The difference G obtained by the distance calculating unit 15, the standard deviation (i.e., reference value) obtained by the standard-deviation calculating unit 14, the first corrected value obtained by the first correction unit 11, and the second corrected value obtained by the second correction unit 12 are supplied to the selection unit 16. The selection unit 16 selects the first corrected value when the difference G between the value of the defective pixel and the representative value of the surrounding pixels is smaller than a first threshold value Th1, and selects the second corrected value when the difference G is larger than or equal to a second threshold value Th2 that is larger than or equal to the first threshold value Th1. The selection unit 16 may obtain the first threshold value Th1 and the second threshold value Th2 as values responsive to the reference value. In this case, the first threshold value Th1 and the second threshold value Th2 may be the same value. In this case, the selection unit 16 selects the first corrected value in the case of the difference G being smaller than the one threshold value, and selects the second corrected value in the case of the difference G being larger than or equal to the one threshold value.

The second threshold value Th2 may be larger than the first threshold value Th1. In this case, the selection unit 16 may output a value between the first corrected value and the second corrected value in the case of the difference G being larger than or equal to the first threshold value Th1 and smaller than the second threshold value Th2. This output value may be a weighted sum of the first corrected value and the second corrected value obtained by use of weights that are responsive to the first threshold value Th1 and the second threshold value Th2. Specifically, an output value OUT of the selection unit 16 may be calculated from the first corrected value H1 and the second corrected value H2 by the following formula.

$$OUT=(1-\alpha)H1+\alpha H2$$

Here, α is a weight responsive to the difference G, the first threshold value Th1, and the second threshold value Th2.

Figure 5:
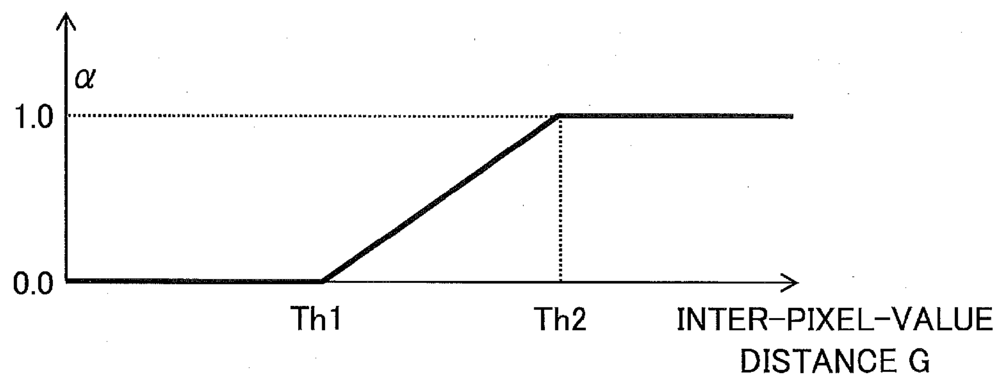
FIG. 5 is a drawing illustrating an example of a weight that is used by a selection unit to calculate the output value thereof.

FIG. 5 is a drawing illustrating an example of the weight α that is used by the selection unit 16 to calculate the output value thereof. In FIG. 5, the horizontal axis represents the distance G between pixels (i.e., the difference between the value of a defective pixel and the representative value of the surrounding pixels), and the vertical axis represents the value of the weight α. As illustrated in FIG. 5, the second threshold value Th2 may be larger than the first threshold value Th1. In the case of the difference G being smaller than the first threshold value Th1, α is equal to zero, so that the output OUT of the selection unit 16 is calculated to be equal to the first corrected value H1. In the case of the difference G being larger than or equal to the second threshold value Th2, α is equal to 1, so that the output OUT of the selection unit 16 is calculated to be equal to the second corrected value H2. In the case of the difference G being larger than or equal to the first threshold value Th1 and smaller than the second threshold value Th2, α assumes a value that linearly increases from 0 to 1 in proportion to the difference between the difference G and the first threshold value Th1. As a result, the selection unit 16 calculates a value that is a composite of the first corrected value and the second corrected value.

The value of the weight illustrated in FIG. 5 is only an example, and is not limited to this example. For example, the relationship between the inter-pixel-value distance G and the weight α may be defined by a curve rather than by a broken line as illustrated in FIG. 5.

It may be noted that the first threshold value Th1 and the second threshold value Th2 may assume different values between the case of the pixel of interest being a white defect and the case of the pixel of interest being a black pixel.

Namely, a first threshold value Th1$a$ and a second threshold value Th2$a$ may be used in the case of the pixel of interest being a white defect while a second threshold value Th1$b$ and a second threshold value Th2$b$, which are different from the first threshold value Th1$a$ and the second threshold value Th2$a$, respectively, may be used in the case of the pixel of interest being a black defect.

Figure 6:
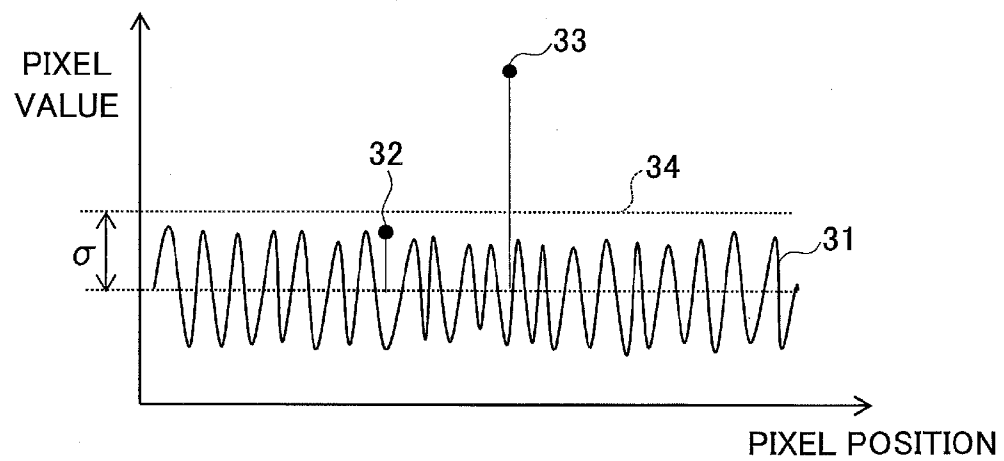
FIG. 6 is a drawing illustrating a method of determining a first threshold value and a second threshold value.

FIG. 6 is a drawing illustrating a method of determining the first threshold value and the second threshold value. In FIG. 6, the horizontal axis represents pixel position in an image, and the vertical axis represents the values of individual pixels. An image data curve 31 represents the values of pixels situated in respective pixel positions as defined on the horizontal axis. The variation of the value of the image data curve 31 represents variation caused by noise introduced into pixel values. A straight line 34 represents the position of the value that is obtained by adding a standard deviation σ to the average of the pixel values.

The first threshold value Th1 and the second threshold value Th2 may be set as follows.

$$Th1=k1\cdot\sigma$$

$$Th2=k2\cdot\sigma$$

Here, k1 and k2 are coefficients for determining the threshold values. k1 may be set equal to 1.0, and k2 may be set equal to 1.5, for example. The values of these coefficients may be determined by a person who adjusts the imaging apparatus having the defective-pixel correcting apparatus embedded therein. Setting the coefficients to appropriate values allows the pixel of interest having a pixel value 32 illustrated in FIG. 6 to be corrected to become the first corrected value, and allows the pixel of interest having a pixel value 33 to be corrected to become the second corrected value, for example.

As was previously described, the selection unit 16 selects the first corrected value when the difference G between the value of the defective pixel and the representative value of the surrounding pixels is smaller than the first threshold value Th1, and selects the second corrected value when the difference G is larger than or equal to the second threshold value Th2 that is larger than or equal to the first threshold value Th1. In a more general expression, the second corrected value that takes into account image directivity is selected when the difference G is relatively large, and the first corrected value that is based on the maximum value or minimum value of the surrounding pixels is selected when the difference G is relatively small.

In the following, an explanation will be given of why it is reasonable to select a different corrected value in response to the size of the difference G as described above. In the following explanation, the ideal value of the pixel of interest is supposed to reside between the maximum of the values of the surrounding pixels and the minimum of the values of the surrounding pixels. Further, although the following explanation will be given with respect to the case of a white defect, the same applies in the case of a black defect.

Figure 7:
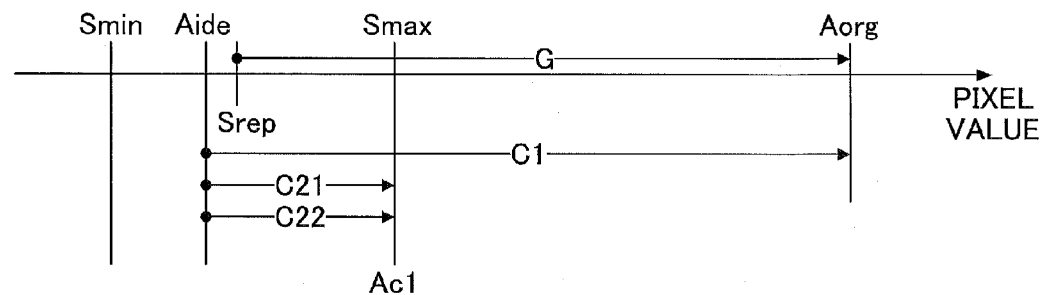
FIG. 7 is a drawing illustrating an example in which there is a large difference between the value of a defective pixel and a representative value of surrounding pixels.

FIG. 7 is a drawing illustrating an example in which there is a large difference between the value of a defective pixel and the representative value of the surrounding pixels. In FIG. 7, the horizontal axis represents pixel values, and a given vertical line placed on the horizontal line indicates a position indicative of the value of a given pixel on the horizontal axis coordinate. Aorg indicates an original value of the pixel of interest (i.e., the value of the pixel prior to correction). Aide indicates the ideal value of the pixel of interest. Smax indicates the maximum value of the surrounding pixels, and Smin indicates the minimum value of the surrounding pixels. Srep indicates the representative value of the surrounding pixels. Ac1 represents the first corrected value. It may be noted that although the second corrected value is not illustrated in FIG. 7, the second corrected value is situated at some position between Smin and Smax. In an example illustrated in FIG. 7, the ideal pixel value Aide is closer to Smin than to Smax.

The difference between the ideal pixel value Aide of the pixel of interest and the pixel value Aorg prior to correction is C1. When correction is performed based on the first corrected value Ac1, the pixel value obtained by this correction is Ac1. The difference between this obtained pixel value and the ideal pixel value Aide (i.e., a residual left after the correction) is C21. When correction is performed based on the second corrected value, the pixel value obtained by this correction is situated between Smin and Smax. The difference between this obtained pixel value and the ideal pixel value Aide (i.e., a residual left after the correction) is C22 at the maximum. Here, C22 is the greater of the difference between Smin and the ideal pixel value Aide, or the difference between Smax and the ideal pixel value Aide.

In the positional relationship illustrated in FIG. 7, the correction residual C21 remaining after the correction is smaller than the difference C1 between the ideal pixel value and the pixel value prior to correction in the case of the first corrected value Ac1 being employed. In the case of the second corrected value being employed, the correction residual remaining after the correction is smaller than the difference C1 between the ideal pixel value and the pixel value prior to correction. Accordingly, use of either the first corrected value or the second corrected value causes image quality to improve through correction. However, the correction residual C21 in the case of the first corrected value being employed is always larger than or equal to the correction residual observed in the case of the second corrected value being used (in which case the correction residual is C22 at the maximum). Accordingly, it is preferable to use the second corrected value over the first corrected value.

Figure 8:
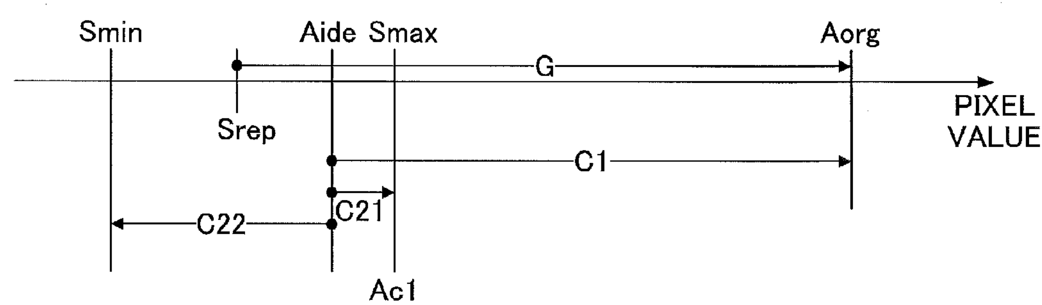
FIG. 8 is a drawing illustrating another example in which there is a large difference between the value of a defective pixel and the representative value of the surrounding pixels.

FIG. 8 is a drawing illustrating another example in which there is a large difference between the value of a defective pixel and the representative value of the surrounding pixels. Notations used in FIG. 8 are the same as or similar to the notations used in FIG. 7. FIG. 8 illustrates a case in which the pixel value Aorg of the pixel of interest is situated at the same position as the positon thereof illustrated in FIG. 7, but the ideal pixel value Aide is closer to Smax than to Smin.

In the positional relationship illustrated in FIG. 8, the correction residual C21 remaining after the correction is smaller than the difference C1 between the ideal pixel value and the pixel value prior to correction in the case of the first corrected value Ac1 being employed. In the case of the second corrected value being employed, the correction residual remaining after the correction is smaller than the difference C1 between the ideal pixel value and the pixel value prior to correction. Accordingly, use of either the first corrected value or the second corrected value causes image quality to improve through correction. However, the correction residual C21 in the case of the first corrected value being employed may sometimes be larger than, and may sometimes be smaller than, the correction residual observed in the case of the second corrected value being used. In this case, which one of the first corrected value and the second corrected value is preferable over the other cannot be ascertained unless the values of the surrounding pixels are known.

As described above, it is preferable to use the second corrected value when the ideal pixel value Aide is closer to Smin than to Smax, and which one of the first corrected value and the second corrected value is preferable is undeterminable when the ideal pixel value Aide is closer to Smax than to Smin. The probability of the ideal pixel value Aide being closer to Smin than to Smax, or the probability of the ideal pixel value Aide being closer to Smax than to Smin, is fifty-fifty. Accordingly, the case in which the difference G between the pixel value Aorg of the pixel of interest and the representative value Srep of the surrounding pixels is relatively large as illustrated in FIG. 7 or FIG. 8 warrants the use of the second corrected value. This is because such an arrangement produces a preferable result at a probability of 50% or more, and never causes image quality to worsen through correction. Namely, it is preferable to use the second corrected value when the difference between the pixel value Aorg of the pixel of interest and the representative value Srep of the surrounding pixels is relatively large.

Figure 9:
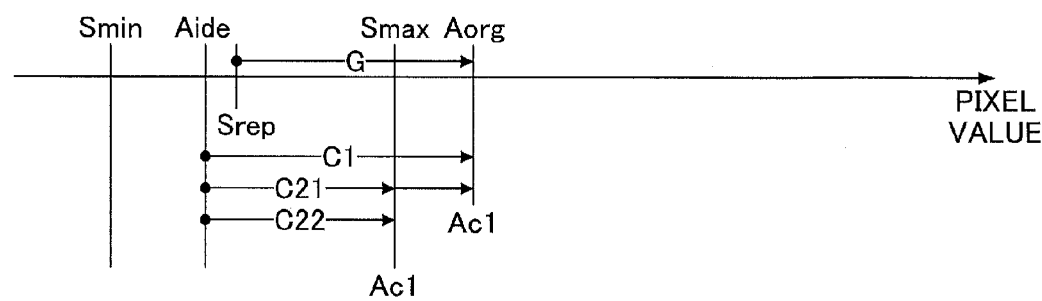
FIG. 9 is a drawing illustrating an example in which there is a small difference between the value of a defective pixel and the representative value of the surrounding pixels.

FIG. 9 is a drawing illustrating an example in which there is a small difference between the value of a defective pixel and the representative value of the surrounding pixels. FIG. 9 illustrates a case in which the difference G between the pixel value Aorg of the pixel of interest and the representative value Srep of the surrounding pixels is small, and Aorg is larger than Smax, with the ideal pixel value Aide being closer to Smin than to Smax. Notations used in FIG. 9 are the same as or similar to the notations used in FIG. 7. Since Aorg is not so far away from Smax, however, the original pixel value Aorg of the pixel of interest may sometimes be used as the corrected pixel value obtained by the first correction unit 11 (see FIG. 1). In consideration of this, FIG. 9 illustrates two cases, i.e., the first case in which the corrected pixel value Ac1 is equal to Smax and the second case in which the corrected pixel value Ac1 is equal to Aorg.

In the positional relationship illustrated in FIG. 9, the correction residual C21 remaining after the correction is smaller than or equal to the difference C1 between the ideal pixel value and the pixel value prior to correction in the case of the first corrected value Ac1 being employed. In the case of the second corrected value being employed, the correction residual remaining after the correction is smaller than the difference C1 between the ideal pixel value and the pixel value prior to correction. Accordingly, use of either the first corrected value or the second corrected value never causes image quality to worsen through correction. On the other hand, the correction residual C21 in the case of the first corrected value being employed is always larger than or equal to the correction residual observed in the case of the second corrected value being used (in which case the correction residual is C22 at the maximum). Accordingly, it is preferable to use the second corrected value over the first corrected value.

Figure 10:
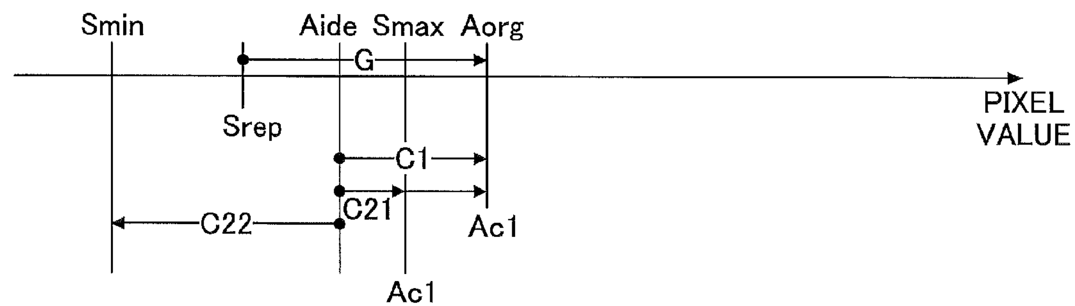
FIG. 10 is a drawing illustrating another example in which there is a small difference between the value of a defective pixel and the representative value of the surrounding pixels.

FIG. 10 is a drawing illustrating another example in which there is a small difference between the value of a defective pixel and the representative value of the surrounding pixels. Notations used in FIG. 10 are the same as or similar to the notations used in FIG. 9. FIG. 10 illustrates a case in which the pixel value Aorg of the pixel of interest is situated at the same position as the positon thereof illustrated in FIG. 9, but the ideal pixel value Aide is closer to Smax than to Smin.

In the positional relationship illustrated in FIG. 10, the correction residual C21 remaining after the correction is smaller than or equal to the difference C1 between the ideal pixel value and the pixel value prior to correction in the case of the first corrected value Ac1 being employed. On the other hand, in the case of the second corrected value being used, the correction residual remaining after correction (which is C22 at the maximum) may sometimes be larger than the difference C1 between the ideal pixel value and the pixel value prior to correction. Namely, use of the second corrected value may cause image quality to worsen through correction.

In the relationships between the pixel values illustrated in FIG. 9 or FIG. 10, the true position of the ideal pixel value Aide is unknown. The ideal pixel value Aide may possibly be closer to Smax than to Smin (as in the case of positional relationships illustrated in FIG. 10). In such a case, use of the second corrected value may cause image quality to worsen through correction. Accordingly, it is preferable to use the first corrected value over the second corrected value when the difference G between the pixel value Aorg of the pixel of interest and the representative value Srep of the surrounding pixels is relatively small, with Aorg being larger than Smax, as in FIG. 9 or FIG. 10. This is because such an arrangement eliminates the possibility of image quality becoming worse than the original quality.

Figure 11:
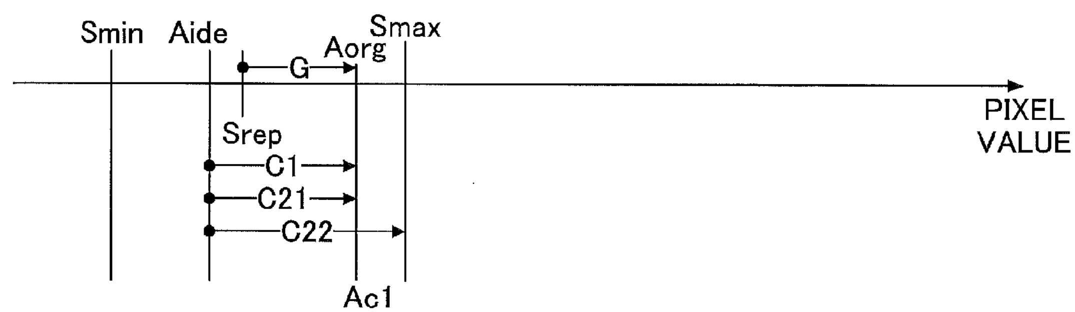
FIG. 11 is a drawing illustrating an example in which there is a small difference between the value of a defective pixel and the representative value of the surrounding pixels.

FIG. 11 is a drawing illustrating an example in which there is a small difference between the value of a defective pixel and the representative value of the surrounding pixels. FIG. 11 illustrates a case in which the difference G between the pixel value Aorg of the pixel of interest and the representative value Srep of the surrounding pixels is small, and Aorg is smaller than Smax, with the ideal pixel value Aide being closer to Smin than to Smax. Notations used in FIG. 11 are the same as or similar to the notations used in FIG. 9.

In the positional relationship illustrated in FIG. 11, the correction residual C21 remaining after the correction is equal to the difference C1 between the ideal pixel value and the pixel value prior to correction in the case of the first corrected value Ac1 being employed. On the other hand, in the case of the second corrected value being used, the correction residual remaining after correction (which is C22 at the maximum) may sometimes be larger than the difference C1 between the ideal pixel value and the pixel value prior to correction. Namely, use of the second corrected value may cause image quality to worsen through correction.

Figure 12:
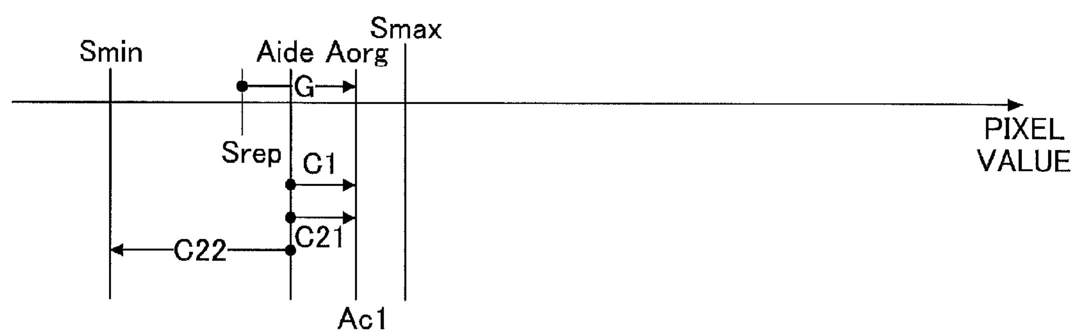
FIG. 12 is a drawing illustrating another example in which there is a small difference between the value of a defective pixel and the representative value of the surrounding pixels.

FIG. 12 is a drawing illustrating another example in which there is a small difference between the value of a defective pixel and the representative value of the surrounding pixels. Notations used in FIG. 12 are the same as or similar to the notations used in FIG. 9. FIG. 12 illustrates a case in which the pixel value Aorg of the pixel of interest is situated at the same position as the positon thereof illustrated in FIG. 11, but the ideal pixel value Aide is closer to Smax than to Smin.

In the positional relationship illustrated in FIG. 12, the correction residual C21 remaining after the correction is equal to the difference C1 between the ideal pixel value and the pixel value prior to correction in the case of the first corrected value Ac1 being employed. On the other hand, in the case of the second corrected value being used, the correction residual remaining after correction (which is C22 at the maximum) may sometimes be larger than the difference C1 between the ideal pixel value and the pixel value prior to correction. Namely, use of the second corrected value may cause image quality to worsen through correction.

With the relationships between the pixel values illustrated in FIG. 11 or FIG. 12, the use of the second corrected value may cause image quality to worsen through correction regardless of the position of the ideal pixel value Aide. Accordingly, it is preferable to use the first corrected value over the second corrected value when the difference G between the pixel value Aorg of the pixel of interest and the representative value Srep of the surrounding pixels is relatively small, with Aorg being smaller than Smax, as in FIG. 11 or FIG. 12. This is because such an arrangement eliminates the possibility of image quality becoming worse than the original quality.

The analysis provided above reveals that it is preferable to select the second corrected value that takes into account image directivity when the difference G is relatively large, and it is preferable to select the first corrected value that is based on the maximum value or minimum value of the surrounding pixels when the difference G is relatively small. The worst condition for use of the second corrected value in terms of the ideal pixel value Aide is the condition in which the ideal pixel value Aide is equal to Smax. This is because the possible maximum value of the correction residual C22 is equal to Smax−Smin, which is the largest that the residual value can ever become. In this worst condition, the case in which the use of the second corrected value causes image quality to worsen can be avoided when the distance between the ideal pixel value Aide and the pixel value Aorg of the pixel of interest is larger than the maximum value of the correction residual C22. When such a condition is satisfied, the difference between the ideal pixel value Aide and the pixel value Aorg of the pixel of interest is always larger than the correction residual C22, so that the use of the second corrected value does not cause image quality to worsen. Consequently, it suffices for the distance between the ideal pixel value Aide (=Smax) and the pixel value Aorg of the pixel of interest to be longer than Smax−Smin. In other words, it suffices for the pixel value Aorg of the pixel of interest to be larger than Smax+[Smax−Smin]. Accordingly, whether the use of the second corrected value is preferable or the use of the first corrected value is preferable changes depending on whether the pixel value Aorg of the pixel of interest is larger than Smax+[Smax−Smin].

In reality, however, a defective pixel may sometimes present in the surrounding pixels. Because of this, it may not be the best practice to switch between the use of the first corrected value and the use of the second corrected value according to the above-noted condition. In reality, it is preferable to switch between the use of the first corrected value and the use of the second corrected value in response to the magnitude of noise introduced into pixel values as was previously described in connection with FIG. 6.

FIG. 13 is a drawing illustrating an example of the configuration of an imaging apparatus. The imaging apparatus illustrated in FIG. 13 includes an image processing unit 40, an imaging device 60, an image data storage unit 70, and an image display unit 80. The image processing unit 40 includes a defective-pixel correcting unit 41, an offset adjusting unit 42, a WB-gain adjusting unit 43, a color interpolation unit 44, a color correction unit 45, a gamma correction unit 46, and a YC conversion unit 47, all of which serve as a processing unit that operates in a default state. The image processing unit 40 further includes a grayscale correction unit 48, a noise suppressing unit 49, an edge enhancing unit 50, a resolution conversion unit 51, and a data compression unit 52, each of which serves as a processing unit that operates as an option.

In the image processing unit 40, the defective-pixel correcting unit 41 has the configuration illustrated in FIG. 1, and performs the correction process as previously described to correct a defective pixel contained in an image from the imaging device 60. The offset adjusting unit 42 adjust offset with respect to the image data for which defective pixels are corrected. The WB-gain adjusting unit 43 adjusts the white balance, and the color interpolation unit 44 performs color interpolation to obtain color data of each pixel based on the color information of an RGB Bayer array. Further, color correction by the color correction unit 45, gamma correction by the gamma correction unit 46, and conversion into a luminance signal and a chrominance signal by the YC conversion unit 47 are performed.

Image data processed by the image processing unit 40 are stored in the image data storage unit 70 and displayed on the image display unit 80. With this arrangement, the image display unit 80 displays an image in which defective pixels have been corrected by the defective-pixel correcting unit 41 and to which various processes have been applied.

According to at least one embodiment, an apparatus for correcting a defective pixel avoids insufficient correction without worsening an image.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An apparatus for correcting a defective pixel, comprising:

a first correction circuit configured to obtain a first corrected value based on a maximum value or minimum value of values of surrounding pixels around a defective pixel;

a second correction circuit configured to identify a direction in which a change in pixel values is the smallest based on the values of the surrounding pixels, and configured to obtain a second corrected value responsive to values of pixels situated in the identified direction among the surrounding pixels; and a selection circuit configured to select the first corrected value to replace a value of the defective pixel that differs from a representative value of the surrounding pixels by a value smaller than a first threshold value, configured to select the second corrected value to replace the value of the defective pixel that differs from the representative value by a value larger than or equal to a second threshold value that is larger than or equal to the first threshold value, and configured to output the selected corrected value that replaces the value of the defective pixel, the selected corrected value being a selected one of the first corrected value and the second corrected value.

2. The apparatus as claimed in claim 1, wherein the second threshold value is larger than the first threshold value, and the selection circuit is configured to output a value situated between the first corrected value and the second corrected value as a corrected value when the difference is larger than or equal to the first threshold value and smaller than the second threshold value.

3. The apparatus as claimed in claim 2, wherein the value situated between the first corrected value and the second corrected value is a weighted sum of the first corrected value and the second corrected value based on a weight responsive to the first threshold value and the second threshold value.

4. The apparatus as claimed in claim 1, further comprising a reference value calculating circuit configured to output a reference value responsive to the representative value of the surrounding pixels, wherein the selection circuit is configured to obtain the first threshold value and the second threshold value as values responsive to the reference value.

5. The apparatus as claimed in claim 4, wherein the reference value increases as the representative value increases.

6. The apparatus as claimed in claim 4, wherein the reference value is a standard deviation of noise of pixel values.

7. The apparatus as claimed in claim 1, wherein the first threshold value and the second threshold value assume different values between a case of the defective pixel being a white defect and a case of the defective pixel being a black defect.

8. A method of correcting a defective pixel, comprising:

obtaining a first corrected value based on a maximum value or minimum value of values of surrounding pixels around a defective pixel;

identifying a direction in which a change in pixel values is the smallest based on the values of the surrounding pixels;

obtaining a second corrected value responsive to values of pixels situated in the identified direction among the surrounding pixels; and selecting the first corrected value to replace a value of the defective pixel that differs from a representative value of the surrounding pixels by a value smaller than a first threshold value, and selecting the second corrected value to replace the value of the defective pixel that differs from the representative value by a value larger than or equal to a second threshold value that is larger than or equal to the first threshold value, thereby outputting the selected corrected value that replaces the value of the defective pixel, the selected corrected value being a selected one of the first corrected value and the second corrected value.

9. An imaging apparatus, comprising:

an imaging device;

a defective pixel correcting circuit configured to correct a defective pixel in an image from the imaging device; and an image display circuit configured to display the image in which the defective pixel is corrected by the defective pixel correcting circuit, wherein the defective pixel correcting circuit includes:

a first correction circuit configured to obtain a first corrected value based on a maximum value or minimum value of values of surrounding pixels around the defective pixel;

a second correction circuit configured to identify a direction in which a change in pixel values is the smallest based on the values of the surrounding pixels, and configured to obtain a second corrected value responsive to values of pixels situated in the identified direction among the surrounding pixels; and a selection circuit configured to select the first corrected value to replace a value of the defective pixel that differs from a representative value of the surrounding pixels by a value smaller than a first threshold value, configured to select the second corrected value to replace the value of the defective pixel that differs from the representative value by a value larger than or equal to a second threshold value that is larger than or equal to the first threshold value, and configured to output the selected corrected value that replaces the value of the defective pixel, the selected corrected value being a selected one of the first corrected value and the second corrected value.

* * * * *